United States Patent [19]

Park

[11] Patent Number: 4,676,141
[45] Date of Patent: Jun. 30, 1987

[54] INFINITESIMALLY VARIABLE HYDRAULIC VALVE

[76] Inventor: DeMoss Park, 717 N. Seventh St., Ponca City, Okla. 74601

[21] Appl. No.: 624,126

[22] Filed: Jun. 25, 1984

[51] Int. Cl.$^4$ .............................................. F15B 11/08
[52] U.S. Cl. ...................................... 91/453; 91/461; 91/462; 137/625.17; 137/625.66; 137/625.68
[58] Field of Search ............. 137/625.17, 625.43, 137/625.68, 625.25, 625.66; 91/462, 467, 466, 453, 418, 461

[56] References Cited

U.S. PATENT DOCUMENTS

| | | | |
|---|---|---|---|
| 148,692 | 3/1874 | Hain et al. | 91/466 |
| 807,865 | 12/1905 | Prescott | 91/466 |
| 3,216,454 | 11/1965 | Richter et al. | 91/453 X |
| 3,318,332 | 5/1967 | Lansky et al. | 137/625.64 |
| 3,941,223 | 3/1976 | Murakami | 137/625.17 |
| 3,949,646 | 4/1976 | Taylor | 137/625.66 |
| 4,199,007 | 4/1980 | Holmes | 91/467 |

FOREIGN PATENT DOCUMENTS

| | | | |
|---|---|---|---|
| 2604208 | 8/1977 | Fed. Rep. of Germany | 137/625.17 |
| 526723 | 9/1976 | U.S.S.R. | 91/462 |
| 524929 | 9/1976 | U.S.S.R. | 91/462 |

Primary Examiner—Edward K. Look

[57] ABSTRACT

A hydraulic valve provides infinitesimally variable flow in both directions through the valve including a position of no flow. The valve can be operated either hydraulically or mechanically. It includes a housing with a bore therethrough, a sleeve slidably mounted inside the bore, and endplates enclosing the ends of the bore. Ports allow controlled passage of hydraulic fluid through the housing, the sleeve, and extensions from the endplates so that fluid from a hydraulic pump enters ports in the housing, flows controllably through the valve, out one of the endplates, through a use apparatus, back into the remaining endplate, and to a sump.

11 Claims, 10 Drawing Figures

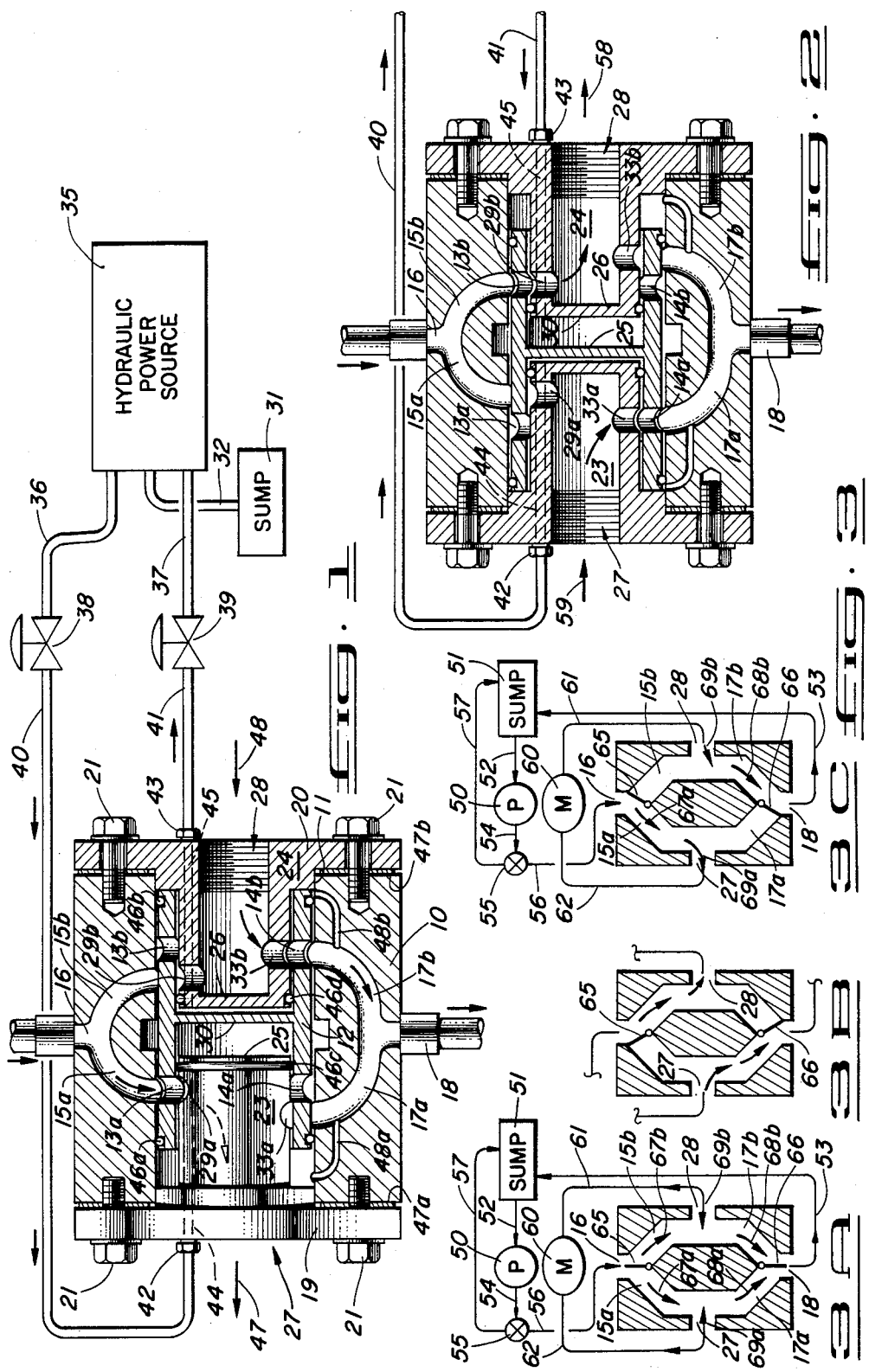

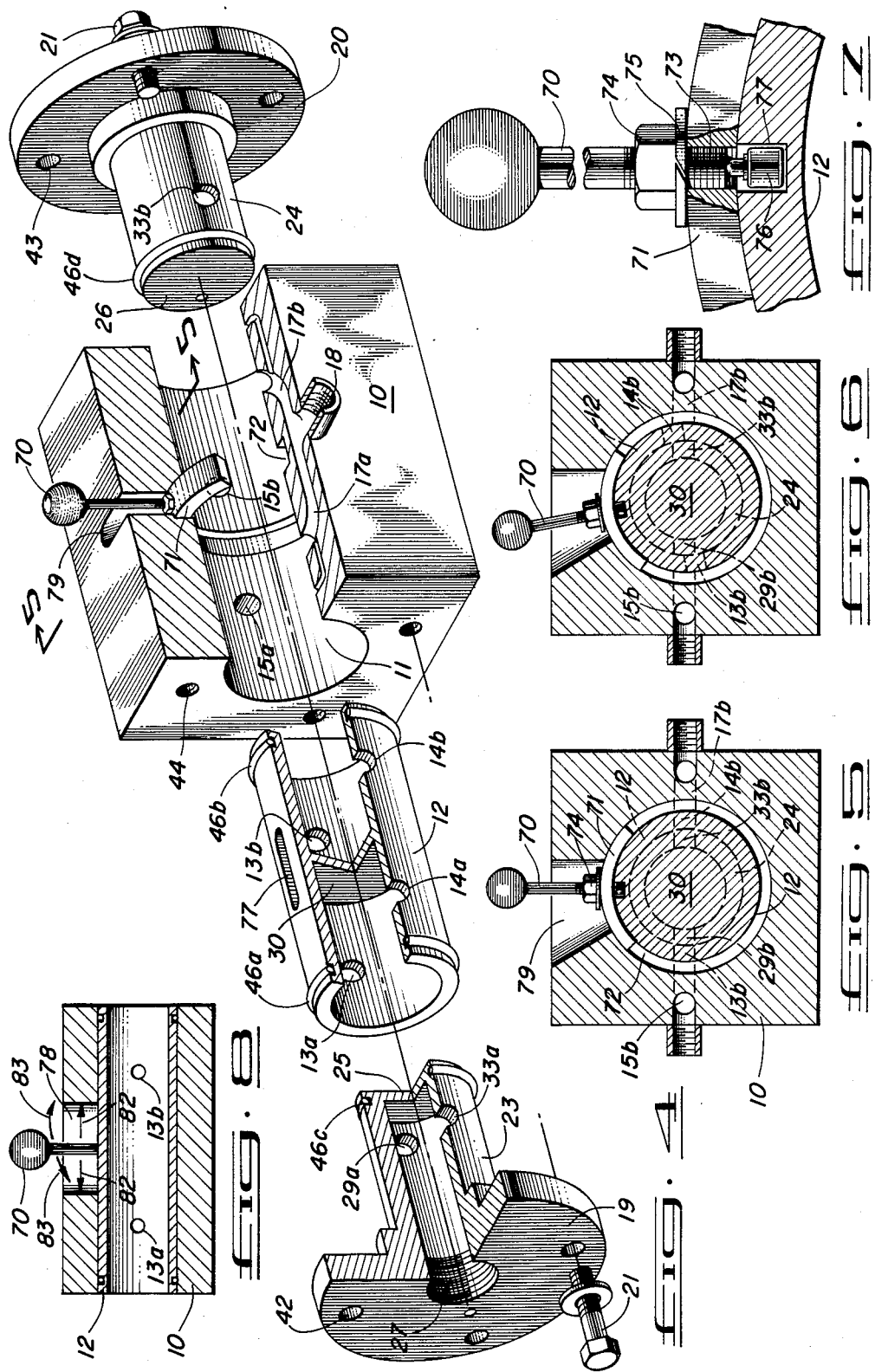

INFINITESIMALLY VARIABLE HYDRAULIC VALVE

BRIEF DESCRIPTION OF THE INVENTION

This invention relates to a hydraulic valve which provides infinitely variable flow in both directions through the valve including a position of no flow. The valve can be operated either manually or hydraulically.

The valve essentially comprises a housing with a bore therethrough. A sliding tube is mounted inside said housing. First and second end plates close each end of the bore, the end plates each have first and second tubular extensions axially disposed through the sliding tube. The facing ends of said tubular extensions are closed while the opposite ends are first and second function ports respectively. First and second control ports and first and second outlet control ports are provided through said housing and through said tubular extensions to said first and second function ports respectively. Mating ports are formed through said sliding tube in a manner to provide fluid communication through the first control port and the first and second tubular extension and the housing to the second control output port. When said sliding tube is in the opposite position, fluid communication is provided through the second control input port, the sliding cylinder and said second cylindrical extension, the first cylindrical extension, and the sliding cylinder and said second output central port.

BRIEF DESCRIPTION OF THE FIGURES

FIG. 1 is a diagramatic drawing of the operation of the valve,

FIG. 2 is a cross section of the valve with the sliding control tube in one position, FIG. 3 comprises individual FIGS. 3A, 3B and 3C which illustrate a cross section of the valve with the sliding control tube in three different positions, FIG. 4 is an expanded perspective view of the valve with a 90° cross section through the valve, FIG. 5 is a cross section of the control tube illustrating connection and movement of the control handle, FIGS. 6 and 7 illustrate the operation of the mechanical control tube, and, FIG. 8 is an illustration of one means of connecting the handle to the control tube.

Referring to all of the figures but in particular to FIG. 1, a continuously controllable valve is illustrated which has a housing 10, having a cylindrical bore 11 therethrough. Axially aligned in cylindrical bore 11 is a control tube 12 which has a pair of inlet ports 13a and 13b. Opposite inlet ports 13a and 13b are outlet ports 14a and 14b. Housing 10 has a pair of corresponding inlet passages 15a and 15b which communicate with inlet port 16. A pair of outlet passages 17a and 17b communicate with an outlet port 18. It should be noted that inlet ports 13a and 13b are arranged so that one of the ports is closed to the flow of fluids from inlet passages 13a or 13b when one of the ports is axially aligned with a corresponding passage. It should also be noted that the diametrically opposite outlet port is likewise fully closed to the flow of fluids.

Enclosing each end is a plate 19 and 20. End plates 19 and 20 are attached to housing 10 by a plurality of bolts 21 in the usual manner. Each end plate 19 and 20 has an extension cylinder 23 and 24 respectively which is attached at one end to end plates 19 or 20 and is closed at the other end by closing means 25 and 26 respectively.

A pair of function ports 27 and 28 are formed through cylindrical extensions 23 and 24 respectively and communicate with ports 13a and 14a, and with 13b and 14b respectively through inlet ports 29a and 29b, and outlet ports 33a and 33b respectively which ports are formed through extensions 23 and 24 and are directly opposite the terminus of inlet passages 15a, 15b and 17a, 17b respectively. Ports 27 and 28 operate as either inlet or outlet ports depending on the position of control tube 12 which operation will be described in a later portion of the specification.

HYDRAULICALLY CONTROLLED EMBODIMENT

The apparatus illustrated in FIG. 1 is a fully hydraulically operated embodiment. To accommodate hydraulic control of control tube 12, a partition 30 is mounted midway between the ends of control tube 12 in the space between the ends 25 and 26 of cylindrical extensions 23 and 24. A hydraulic power source and control apparatus 35 is coupled through a pair of tubes 36 and 37 to a pair of valves 38 and 39 respectively. Tubes 40 and 40 couple the hydraulic output from valves 38 and 39 respectively to input ports 42 and 43 which convey the hydraulic output through each of the cylindrical extensions 23 and 24 respectively by means of a pair of bored holes 44 and 45 respectively.

"O" rings 46a, 46b, 46c and 46d provide seals between control tube 12 and cylindrical extensions 23 and 24, and housing 10. A pair of seals 47a and 47b likewise provide seals between each endplate 19 and 20, and housing 10. Additional leakage protection can be afforded by a pair of channels 48a and 48b which will cause any hydraulic fluid which passes seals 46a or 46b to be drained into passages 17a or 17b respectively. A sump 31 is coupled through a pipe 32 to hydraulic power source 35.

OPERATION

The operator of the embodiment illustrated in FIG. 1 can be best understood by reference to FIGS. 2 and 3A, 3B and 3C. Referring in particular to FIG. 3A, a hydraulic pump 50 is connected from its inlet port to a sump 51 through a pipe 52. A pipe 53 will couple the outlet port 18 to sump 51. The output from pump 50 is coupled through a pipe 54 to a relief valve 55 and through a pipe 56 to the inlet port 16. Pipe 57 couples relief valve 55 to sump 51. A use item such as a hydraulic motor 60 has one port coupled through a pipe 61 to function port 28, and its remaining port coupled through a pipe 62 to function port 27. In the operational drawings FIGS. 3A through 3C, the control tube will be represented by a pair of vanes 65 and 66.

The device operates in the following manner. In the FIG. 3A, vanes 65 and 66 are in a neutral position allowing hydraulic fluid to flow equally through both passages 15a and 15b, and 17a and 17b in the direction of arrows 67a, 67b and 68a, 68b. Under these conditions, the pressure at ports 27 and 28 will be the same. Thus, hydraulic fluid can flow in either direction as indicated by arrows 69a or 69b, however, the hydraulic fluid will probably not flow in either direction if the pressures at ports 27 and 28 are identical. In view of the above, no hydraulic fluid will be flowing through pipes 61 or 62 through motor 60 or other device 60. Motor 60 will, therefore, not be rotating in either direction. If device 60 is a piston, then it will remain in one position. It should also be noted that if device 60 is a piston, then the pressure on each side of the piston is the same. Under these conditions, the piston will be hydraulically locked into its last position.

Referring to FIG. 3B, if vanes 65 and 66 are in the position illustrated, then hydraulic fluid is flowing out of port 28, through device 60 and to port 27. Depending on the device 60, if it is a motor, it will be rotating at full rotational speed in one direction. Referring to FIG. 3C, vanes 65 and 66 are in the opposite direction from that illustrated in FIG. 3A. Under these conditions, the flow of hydraulic fluid will be out of port 27, through device 60 in the opposite direction as that illustrated in FIG. 3A, causing the device, if it is a motor, to rotate in the opposite direction at full rotation. It should be obvious that any position of vanes 65 or 66 between the two extremes illustrated in FIGS. 3A and 3C, will give a direction flow with a proportionally decreased rotation, depending on the positions of vanes 65 and 66.

Returning to FIGS. 1, 3A, 3B and 3C, the control tube operates in the same manner as vanes 65 and 66.

Tube 12 is positioned either at endplate 19 or endplate 20 hydraulically by hydraulic source 35 caused by applying a differential pressure on each side of partition 30. If the pressure is applied by valve 38 through pipe 40, port 42 and bored hole 40 to the space between closing means 25 and partition 30. Hydraulic fluid ports out of the space between partition 30 and closing means 26, through bored hole 45, port 43, pipe 41, valve 39 and pipe 37 to hydraulic power source 35 and to a pipe 32 and a sump 31. The position of valves 38 and 39 will determine which space is filled with hydraulic fluid under pressure and which space is exhausted to the sump. It should be obvious that since both sides are filled with hydraulic fluid, closure of both valves or the discharge valve, will hydraulically leave control tubes in that position when the valve was closed.

Assuming control tube 12 is in the position illustrated in FIG. 1, valve 38 will be open to the pressure side of hydraulic source 35. Under these conditions, the flow of fluids through the control circuit is through inlet port, through control tube inlet port 13a (13b is blocked), through inlet port 29a of cylindrical extension 23 and out function port 27, through the use equipment flowing in the direction of arrow 47. The return from the use equipment is in the direction of arrow 48 through function port 28, through outlet port 33b of cylindrical extension 24, through outlet port 14b or control tube 12 and into outlet passage 17b to outlet port 18, where it returns to the sump. The configuration of FIG. 1 is the same as the illustrated usage in FIG. 3C.

FIG. 2 illustrates the situation when control tube 12 is in the opposite position with partition 30 moved near closing means 25. In this illustration, hydraulic fluid under pressure enters pipe 41, through coupling or port 43, bored hole 45 to the space between closing means 26 and partition 30 moving tube 12 toward closing means 25 forcing the hydraulic fluid out of the space between partition 30 and closing means 25, through bored hole 44, port 42 and pipe 40 to hydraulic source 35 (not illustrated in FIG. 2) and probably to a sump.

The use apparatus will get hydraulic fluid from a pump (see FIG. 3A) which fluid will enter inlet port 16, through inlet passages 15b, through port 13b in control tube 12, through port 20b in extension 24 and out function port 28 in the direction of arrow 58. The fluid will then pass through the use apparatus (for example motor 60 in FIG. 3) and return in the direction of arrow 59 to function port 27. Port 13a is blocked hydraulic fluid must then return through port 33a, port 14a in control tube 12 to outlet passage 17a to outlet port 18 where it returns to a sump (see FIG. 3).

It should be obvious from the above that if control tube 12 is hydraulically locked at any position between that illustrated in FIG. 1 and FIG. 3, then all of the ports will be open to a degree depending upon the actual location of partition 30 with respect to closing means 25 and 26. An in between position will divide the pressure between function ports 27 and 28. If the partition 30 is exactly half way between closing means 25 and 26, then function ports 27 and 28 would have equal pressure. If (see FIG. 3B) device 60 were a piston, it would be hydraulically locked in the position it was in at the time the locking situation occurred.

MECHANICALLY-HYDRAULICALLY CONTROLLED EMBODIMENT

Referring to FIGS. 4 through 7, a mechanically and hydraulically controlled embodiment is illustrated. Only the differences between the hydraulically controlled embodiment will be discussed. The operation of the control valve 12, aside from the mechanical method for axially shifting the control tube 12, is exactly the same as that already described in FIGS. 1 through 3. The same numbers will be used for identical parts.

The method for shifting control tube 12 axially comprises a handle 70 which is connected to a control ring segment 71 which in turn fits into a slot 72 in housing 10 (see FIG. 4). Referring to FIG. 7, handle 70 is connected to ring segment 71 by means of a threaded portion 73 and is locked to segment 71 by a bolt 74 and washer 75. Handle 70 extends into and engages a slot 77 in control tube 12 and includes a cylindrical roller 76 which fits into slot 77. Handle 70 passes through a slot 79 in housing 10.

The hydraulic method and apparatus for shifting control tube 12 along its axis as illustrated in FIGS. 1 and 2 is exactly the same.

OPERATION

The arrangement illustrated in FIGS. 4 through 7 provides precise control of the flow of hydraulic fluids from inlet port 16, to the use apparatus 60 and to the outlet port 18. The flow control is as follows: Direction of flow, that is, which the fluid is flowing as illustrated in FIGS. 3A, 3B or 3C, depends upon the position of control 12, as previously discussed. The precise positioning of control tube 12, however, in order to control flow through port 13a or 13d, 14a or 14b require exact control of the hydraulic power source 35 and its respective control valves. Another way to accomplish this control is to move the control tube 12 completely toward end 19 or end 20 which will open ports 13a and 14b or 13b and 14a either partially or completely. Control of the flow can then be accomplished by moving handle 70 along slot 79 as illustrated in FIG. 5 from the neutral or open position to a shifted position as illustrated in FIG. 6. The more handle 70 is moved along slot 79, the more port 14b is closed with respect to port 33b and passage 17b. If handle 70 is rotated completely, then port 13b is completely rotated away from port 33b and thus port 33b is completely cut off from the flow of hydraulic fluid. Inlet ports 13a and 29a will function in exactly the same manner. Slot 72 retains ring segment 71 from movement along the axis of control tube 12.

MECHANICAL EMBODIMENT

A simplified mechanical embodiment of a portion of the valve is illustrated in FIG. 8. In this embodiment no hydraulic shifting apparatus is required such as hydraulic power source 35, its necessary valves, pipe, holes 45 and 46 or partition 30 which function solely as a piston to shift control cylinder 12 toward end plates 19 or 20.

In the mechanical embodiment handle 70 is attached directly to tube 12 on its outer periphery as illustrated in FIG. 8. Slot 78 must cut through housing 10 having the same length and direction as slot 77 in control tube 12.

OPERATION

Instead of control tube 12 being moved hydraulically along the axis of tube 12, it is moved mechanically along this axis by grasping handle 70 and pushing or pulling it in the desired direction as illustrated by arrows 82. The tube can also be rotated on its axis by moving it in the direction of arrow 83. The longitudinal slot 78 can be made as wide as necessary to accommodate rotation of handle 70 to fully cut off ports 13a and 29b, 14b and 33b.

CONCLUSIONS

A fully controllable valve is disclosed which permits flow in either direction through a use apparatus such as a piston or motor. The valve also provides for precise control over the flow of hydraulic fluid regardless of the direction of flow through the use equipment. Since the valve will control both direction and flow it makes a valve function as a regulator valve because it will control pump pressure so that a pump with fixed displacement and pressure will act like a variable displacement pump or a switch plate pump. Further, the valve will provide movement fully in one direction and change directions of flow instantly at full pressure in the reverse direction.

It is obvious that for illustration purposes, a separate hydraulic source was illustrated for operating the valve. The same hydraulic source can be used for the use apparatus as for the control of the valve if desired. It is also obvious that other combinations of hydraulic and mechanical control for tube 12 can be used and still be within the apparatus as claimed.

It is also obvious that changes and modifications can be made in the apparatus as disclosed and still be within the spirit and scope of the invention as described in the specification and appended claims.

What I claim is:

1. A valve assembly comprising;
    a. a housing containing a cylindrical bore extending therethrough, said bore having first and second ends;
    b. a sleeve having an outside diameter less than the diameter of said cylindrical bore;
    c. first and second end plates mounted to said housing and enclosing said first and second ends respectively of said cylindrical bore;
    d. cylindrical portions mounted in axial alignment with said sleeve axis, said portions attached to said end plates and extending into and inside of said sleeve and terminating with an end closure means;
    e. first and second function port means through said end plate means and communicating with said cylindrical extensions;
    f. first and second inlet means passing through said housing and communicating with each side of the midpoint of the length of said cylindrical bore;
    g. first and second outlet means through said housing and communicating with each side of the midpoint of the length of said cylindrical bore;
    h. first and second inlet port means through said sleeve spaced so that only one of said inlet port means communicates with said first or second inlet means in said cylinder with said sleeve in a first position, and said remaining inlet port means in said sleeve communicates with said remaining inlet means in said housing when said sleeve is in a second position;
    i. port means through said first and second extensions aligned with said first and second inlet means, and with said first and second outlet means and communicating with said first and second function port means respectively; and,
    j. means for axially shifting said sleeve;
    whereby fluid passing into said inlet port can pass through one side only of said sleeve, depending upon the axial position of said sleeve and out of said corresponding port through said end plate.

2. An apparatus as described in claim 1 wherein said sleeve contains a disc closure midway along its axis, and wherein said means for axially shifting said sleeve comprises a hydraulic source, first and second openings communicating to each side of said disc closure means, and means for controllably coupling said hydraulic source to said openings, whereby said hydraulic source can cause pressure on a selected side of said disc closure and force said sleeve toward either said first or second ends of said housing.

3. Apparatus as described in claim 1 wherein said means for axially shift said sleeve comprises a longitudinal slot means formed in said housing, and a handle means mounted through said slot means and attached on the periphery of said sleeve.

4. Apparatus as described in claim 2 wherein said housing contains a longitudinal slot means along the periphery of said sleeve, said cylindrical bore includes a radial slot between said first and second end, ring segment means mounted in said radial slot, slot means formed in said housing, and a handle means mounted through said slot means in said housing and attached to said ring segment means, said handle means having an extension into said longitudinal slot means, whereby said sleeve can be moved hydraulically along said bore, and rotated about its axis by said handle means.

5. Apparatus for controlling the direction and flow of hydraulic fluids through an use apparatus comprising:
    a. a housing having first and second ends and having a bore means extending therethrough;
    b. sleeve means slidably mounted inside said bore means and having a length less than that of said bore means;
    c. a hydraulic supply means;
    d. first and second spaced fluid inlet means through said housing and communicating with said sleeve means;
    e. first and second spaced fluid outlet means through said housing and communicating with said sleeve means;
    f. end closure means attached to said housing over said bore means terminus, said end closure means including extensions into said bore means, and function port means passing through said end closure means and through said extensions;
    g. a first inlet and outlet port means through said sleeve means and aligned with said spaced fluid inlet means when said sleeve means is in a first axial position at said first end of said housing, and a second inlet and outlet port means aligned with said second spaced fluid inlet and outlet means when said sleeve means is in a second position at said second end of said housing;

h. inlet extension port means through said extensions and inlet means, and outlet extension port means through said extensions aligned with said spaced fluid outlet means;

i. means for shifting said sleeve means along the axis of said bore means; and j. means for coupling said function port means to said use apparatus and means for coupling said spaced fluid inlet means to said hydraulic supply means and means for coupling said spaced fluid outlet means to a sump.

6. Apparatus as described in claim 5 wherein said use apparatus is a hydraulic motor.

7. Apparatus as described in claim 5 wherein said use apparatus is a hydraulic piston.

8. Apparatus as described in claim 5
wherein said means for axially shifting said sleeve means comprises an opening through said housing through each of said first and second ends, disc closure means mounted midway inside said sleeve means, and means for communicating hydraulic fluid to either side of said disc closure means through said openings;

whereby hydraulic fluid will create pressure on one side forcing said sleeve means to one end of said housing, and pressure on the other side of said disc closure means will force said sleeve means to the other end of said housing.

9. Apparatus as described in claim 5 werein said means for shifting said sleeve means comprises a handle means attached to said sleeve means.

10. Apparatus as described in claim 5 wherein said means for axially shifting said sleeve means comprises a longitudinal slot means formed in said housing, and a handle means mounted through said slot means and attached on the periphery of said sleeve means.

11. Apparatus as described in claim 5 wherein said housing contains a longitudinal slot means along the periphery of said sleeve means, said bore means includes a radial slot means between said first and second ends, ring segment means mounted in said radial slot means, slot means formed in said housing, and a handle means mounted through said slot means in said housing and attached to said ring segment means, said handle means having an extension into said longitudinal slot means, whereby said sleeve can be moved hydraulically along said bore means and rotated about its axis by said handle means.

* * * * *